United States Patent
Lopes et al.

(10) Patent No.: US 11,070,434 B2
(45) Date of Patent: Jul. 20, 2021

(54) COMMUNICATIONS NETWORK NODE

(71) Applicant: Microsoft Technology Licensing, LLC, Redmond, WA (US)

(72) Inventors: Nuno Claudino Pereira Lopes, Cambridge (GB); Andrey Aleksandrovic Rybalchenko, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 15/636,575

(22) Filed: Jun. 28, 2017

(65) Prior Publication Data

US 2018/0309635 A1    Oct. 25, 2018

(30) Foreign Application Priority Data

Apr. 24, 2017    (GB) ...................... 1706475

(51) Int. Cl.
*H04L 12/24*    (2006.01)
*H04L 12/751*    (2013.01)
(Continued)

(52) U.S. Cl.
CPC ............ *H04L 41/12* (2013.01); *H04L 41/082* (2013.01); *H04L 45/02* (2013.01); *H04L 45/124* (2013.01);
(Continued)

(58) Field of Classification Search
CPC ....... H04L 41/12; H04L 41/082; H04L 45/02; H04L 45/04; H04L 45/12; H04L 45/64;
(Continued)

(56) References Cited

U.S. PATENT DOCUMENTS 6,654,365 B1    11/2003    Sylvester et al.
7,058,016 B1    6/2006    Harper
(Continued)

FOREIGN PATENT DOCUMENTS

CN    102026098 A    4/2011
CN    102299854 B    11/2012
(Continued)

OTHER PUBLICATIONS

"International Search Report and Written Opinion Issued in PCT Application No. PCT/US2018/027842", dated Aug. 1, 2018, 11 Pages.
(Continued)

*Primary Examiner* — Marsha D Banks Harold
*Assistant Examiner* — Dharmesh J Patel

(57) ABSTRACT

A communications network node has a memory storing information about the topology of a network, configuration data comprising attributes of the network, and information about a routing protocol of the network. The memory stores a comparison function derived from a best path definition of the routing protocol. A path finding component of the node computes, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes.

20 Claims, 6 Drawing Sheets

(51) Int. Cl.
*H04L 12/721* (2013.01)
*H04L 12/26* (2006.01)

(52) U.S. Cl.
CPC ...... *H04L 43/0864* (2013.01); *H04L 43/0888* (2013.01)

(58) Field of Classification Search
CPC ... H04L 45/021; H04L 45/123; H04L 45/124; H04L 45/26; H04L 45/302; H04L 47/29; H04L 61/2596; H04L 61/35; H04L 61/6022; H04L 61/6072
See application file for complete search history.

(56) References Cited

U.S. PATENT DOCUMENTS

| | | | |
|---|---|---|---|
| 8,830,820 | B2 | 9/2014 | Mandal et al. |
| 9,106,512 | B2 | 8/2015 | Punati et al. |
| 9,191,139 | B1 | 11/2015 | Venkata et al. |
| 2002/0174246 | A1 | 11/2002 | Tanay et al. |
| 2005/0074003 | A1* | 4/2005 | Ball et al. |
| 2006/0007865 | A1* | 1/2006 | White et al. |
| 2006/0268681 | A1* | 11/2006 | Raza ................ H04L 45/02 370/216 |
| 2007/0189284 | A1* | 8/2007 | Kecskemeti |
| 2007/0263592 | A1 | 11/2007 | Agarwal et al. |
| 2008/0320166 | A1 | 12/2008 | Filsfils et al. |
| 2010/0329154 | A1 | 12/2010 | Charzinski et al. |

FOREIGN PATENT DOCUMENTS

| | | |
|---|---|---|
| CN | 105429877 A | 3/2016 |
| WO | 2016083844 A1 | 6/2016 |

OTHER PUBLICATIONS

Fuszner, Mike, "GNS3", https://www.csd.uoc.gr/~hy435/material/GNS3-0.5-tutorial.pdf, Retrieved on: Mar. 27, 2017, 48 pages.
Muhammad, et al., "Central Routing Algorithm: An Alternative Solution to Avoid Mesh Topology in iBGP", In Journal of Procedia Computer Science, vol. 37 Jan. 2014, pp. 85-91.
Xiao, et al., "Reducing Routing Table Computation Cost in OSPF", In Proceedings of IEEE Internet Workshop, Feb. 18 1999, 10 pages.
Fogel, et al., "A General Approach to Network Configuration Analysis", In Proceedings of the 12th USENIX Symposium on Networked Systems Design and Implementation, May 4, 2015, pp. 469-483.
"First Office Action and Search Report Issued in Chinese Patent Application No. 201880025742.6", dated Apr. 20, 2021, 9 Pages.

* cited by examiner

COMMUNICATIONS NETWORK NODE

CROSS-REFERENCE TO RELATED APPLICATIONS

This application claims priority to GB application serial number 1706475.9, filed Apr. 24, 2017, the entirety of which is hereby incorporated by reference herein.

BACKGROUND

Telecommunications networks, data center networks, and others are increasingly heavily used and require careful and efficient control in order to make the best use of resources available and in order to carry out fault management, maintenance and other control operations.

Data is transmitted through telecommunications and other networks by transmitting it between nodes of the network where the nodes are interconnected by communications links, also referred to as edges. When data reaches a node in the network, that node has to transmit the data onwards towards its final destination. In order to do this the node which does the forwarding typically uses a routing table or similar information which is available locally at the node. The routing tables thus influence the behavior and performance of the communications network.

Control of telecommunications and other networks often involves computation and deployment of the routing tables, and/or using knowledge of the routing tables as part of information influencing management of the communications network. Telecommunications and other network verification systems typically use routing table information and so do other network management systems such as traffic engineering systems.

The embodiments described below are not limited to implementations which solve any or all of the disadvantages of known communications network nodes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A node of a communications network is described. The node has a memory storing information about the topology of the network, configuration data comprising attributes of the network, and information about a routing protocol of the network. The memory stores a comparison function derived from a best path definition of the routing protocol. A path finding component of the node computes, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
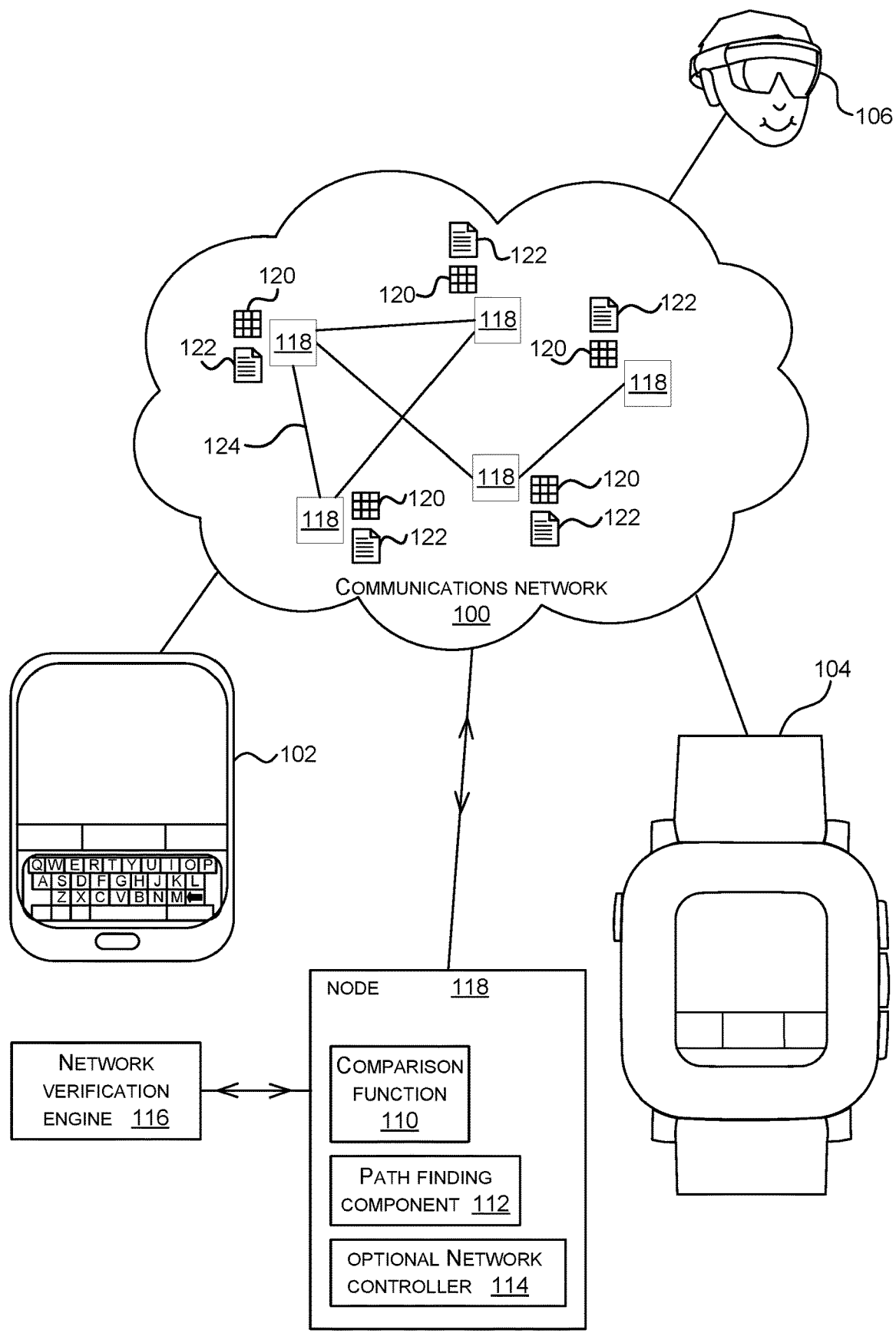
FIG. 1 is a schematic diagram of a communications network node and communications network.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Various examples describe a node of a communications network which computes, either by itself or as part of a process distributed over a plurality of nodes of the communications network, routing tables for nodes of the communications network in a fast and efficient manner and so that the routing tables together specify optimal pathways through the communications network. An optimal pathway is one which is best with respect to one or more attributes of configuration data of the nodes. A non-exhaustive list of examples of attributes is: bandwidth of an outgoing edge from the node, bandwidth of an incoming edge to the node, processing capacity of the node, round trip time from the node to a neighbor, cost of peering.

A routing table is a data structure associated with a node of a communications network such as a router, switch, gateway or other node of a communications network. The data structure holds information about where to forward or transmit data which arrives at the node, where the data is destined for another node in the communications network. The node is typically connected to a plurality of neighbor nodes. The data structure holds information about the appropriate neighbor node to use, where the incoming data is addressed to a destination node which is elsewhere in the communications network and is not one of the neighbor nodes. Where the capacity of the routing table is too small to cope with the number of nodes and/or networks in the communications network, route aggregation may be used. Route aggregation is the process of forming a larger network from the combination of two or more sub-networks. A route prefix (such as an internet protocol prefix) for the combined network represents the sub-networks in a single routing table entry.

A routing table may be represented using a symbolic (as opposed to concrete) representation in some cases. A symbolic representation of a routing table enables a concise representation of multiple sets of optimal routing tables in situations where multiple sets of optimal routing tables are possible.

A routing protocol is a plurality of defined types of messages with instructions and information about how to interpret the messages and instructions. Routers or other network nodes use the messages, instructions and information to communicate with one another in order to select routes to use between nodes when transmitting data in the communications network. Examples of routing protocols used in some examples described herein include Border Gateway Protocol (BGP), Open Shortest Path First (OSPF), intermediate system to intermediate system protocol (IS-IS), routing information protocol (RIP). However, the scope of the technology is not limited to these routing protocols.

The best path definition of a routing protocol is one or more rules, thresholds or criteria which specify how to make a routing decision; that is, how to select one of the paths between an origin and a destination as being best as compared with other paths between the origin and the destination. The best path definition uses one or more routing metrics as part of the best path definition. The routing metrics are attributes of the network such as path bandwidth, path type, observed traffic throughput on a path, round trip time, dropped packet frequency on a path, or other attributes.

In the case of Border Gateway Protocol, the particular best path definition used depends on the particular instantiation of the protocol used in the communications network. Border Gateway Protocol is defined as a standard by the Internet Engineering Task Force (IETF) in various request for comment (RFC) documents and it makes routing decisions based on one or more factors such as one or more of: path attributes, network policies, rules configured by a network administrator, or other factors.

In the case of OSPF the best path definition uses path cost as the routing metric where path cost is typically determined by the bandwidth of the path.

The term "neighbor" is used herein to refer to an immediate neighbor. An immediate neighbor is a node which is directly connected to the node of which it is a neighbor, or which is reachable in a single hop, or through a tunnel established with some other means such as a virtual large area network or a multiprotocol label switching (MPLS) tunnel.

Existing approaches for computing routing tables comprise running a distributed protocol (or simulations of this) where neighbor nodes of the communications network exchange information with one another. This is a slow process since information from a node at one end of a network takes a long time to propagate through many intermediate nodes to a node at the other end. As a result it is difficult to properly control communications networks dynamically since the routing tables influence how the network will behave. If changes to routing tables are planned it is difficult to assess what changes these will have on the network behavior in practical time scales. Often, where the numbers of nodes in the network is vast (such as in the case of the internet) it is simply not possible to simulate the computation of routing tables which are optimal with respect to specified attributes using conventional computing resources, due to the scale of the problem.

FIG. 1 is a schematic diagram of a communications network 100, comprising a plurality of nodes 118 such as routers, switches, gateways or other communications network nodes which are interconnected by communications links. The communications network is a telecommunications network in some examples, or an internet protocol network or any other type of communications network. In some cases the physical infrastructure of communications network 100 is controlled using software-defined networking. In some cases the communications network comprises an optical communication network. The communications network 100 is a combination of one or more different types of communications network in some cases.

Individual nodes 118 of the communications network 100 have associated routing tables 120 and configuration files 122 as illustrated in FIG. 1. A configuration file is data specifying how a network node is to behave. A non-exhaustive list of examples of data in a configuration file is: neighbors a node is authorized to communicate with, networks a node is authorized to forward traffic to or from, traffic engineering parameters, information about which networks are to be aggregated, information about how to aggregate various of the networks, addresses of local interfaces, number of autonomous systems in the case of border gateway protocol. Although five nodes 118 are illustrated in FIG. 1, in practice there will be many more and in the case of vast communications networks such as the internet there may be millions or more nodes 118. The nodes 118 illustrated in FIG. 1 are intermediate nodes as they are intermediate between end points such as terminal nodes 102, 104, 106. Many more terminal nodes are present in practice and the smart phone 102, smart watch 104 and augmented reality head worn computing device 106 are examples which are not intended to limit the scope of the technology.

In the example of FIG. 1 one of the nodes 118 is shown expanded to give more detail about the functionality of each of the nodes 118.

In some examples, such as where software defined networking is used, the communications network comprises at least one node 118 which acts to control, change and manage behavior of the communications network. For example, the node shown expanded in FIG. 1 is an example of such a node which acts as a central control function. A node 118 with a control function has a network controller 114 which sends instructions to others of the nodes 118 in order to trigger updates of the routing tables 120 or effect other changes such as updating one or more of the configuration files 122, reconfiguring one or more of the nodes 118, or taking other actions. The network controller 114 receives data about the behavior of the communications network 100 such as traffic flow statistics and other data from nodes 118. However, it is not essential to have a network controller 114.

In some cases where a central control node is used this node is able to compute routing tables for the nodes 118 of the communications network in an efficient and practical manner. In this case at least one of the nodes 118 has a path finding component 112 which acts to compute paths through the communications network 100 in order to compute the routing tables 120. The path finding component implements a search which given an individual one of the nodes 118, computes optimal paths from that node to each of the other nodes 118 of the communications network 110. The paths are optimal according to a best path definition of a routing protocol of the communications network as explained in more detail below. The path finding component has information about the topology of the communications network 100 and optionally information from the configuration files 122. The configuration files are able to change the behavior of a comparison function as explained in more detail below.

At least one of the nodes 118 has a comparison function 110 which takes as input information about two nodes (or two sub-networks) of the communications network 100. The comparison function computes an order of preference of the two nodes (or the two sub-networks) where the preference is according to the best path definition of the routing protocol. In some cases one or more attributes from the configuration files are available and are used as part of the comparison function. This changes the behavior of the comparison function and hence changes the meaning of what is an optimal path.

In some examples, each node of the communications network is arranged to send network export messages to its neighbors with information about sub-networks which are reachable from the node. In an example, each node sends a control message (referred to herein as a network export message) with information about one of its reachable sub-networks, and does so for each sub-network which is reachable from the node. A network export message is sent by a node to its neighbors, advertising a network such as a sub-network which is reachable from the node. Where the network export messages are available, the comparison function acts to compare two network export messages and computes an order of preference of the network export messages.

In some examples the node 118 is connected to a network verification engine 116 although this is not essential. The network verification engine 116 acts to check that the communications network 100, given a specified set of routing tables 120 (which may be represented symbolically as mentioned above) is able to meet expected behavior of the communications network defined using criteria. In order to obtain information about the routing tables the verification engine is able to access routing table data from the node 118. As the node 118 is able to compute the routing tables in practical time scales it is possible to assess a proposed change to the configuration files using the verification engine before the configuration change is deployed to the communications network 100.

In some examples routing tables are computed using a distributed process distributed over a plurality of the nodes 118 of the communications network 100. In this case, each of the nodes 118 involved in the distributed process has functionality implementing the path finding component 112 and the comparison function 110.

Figure 2:
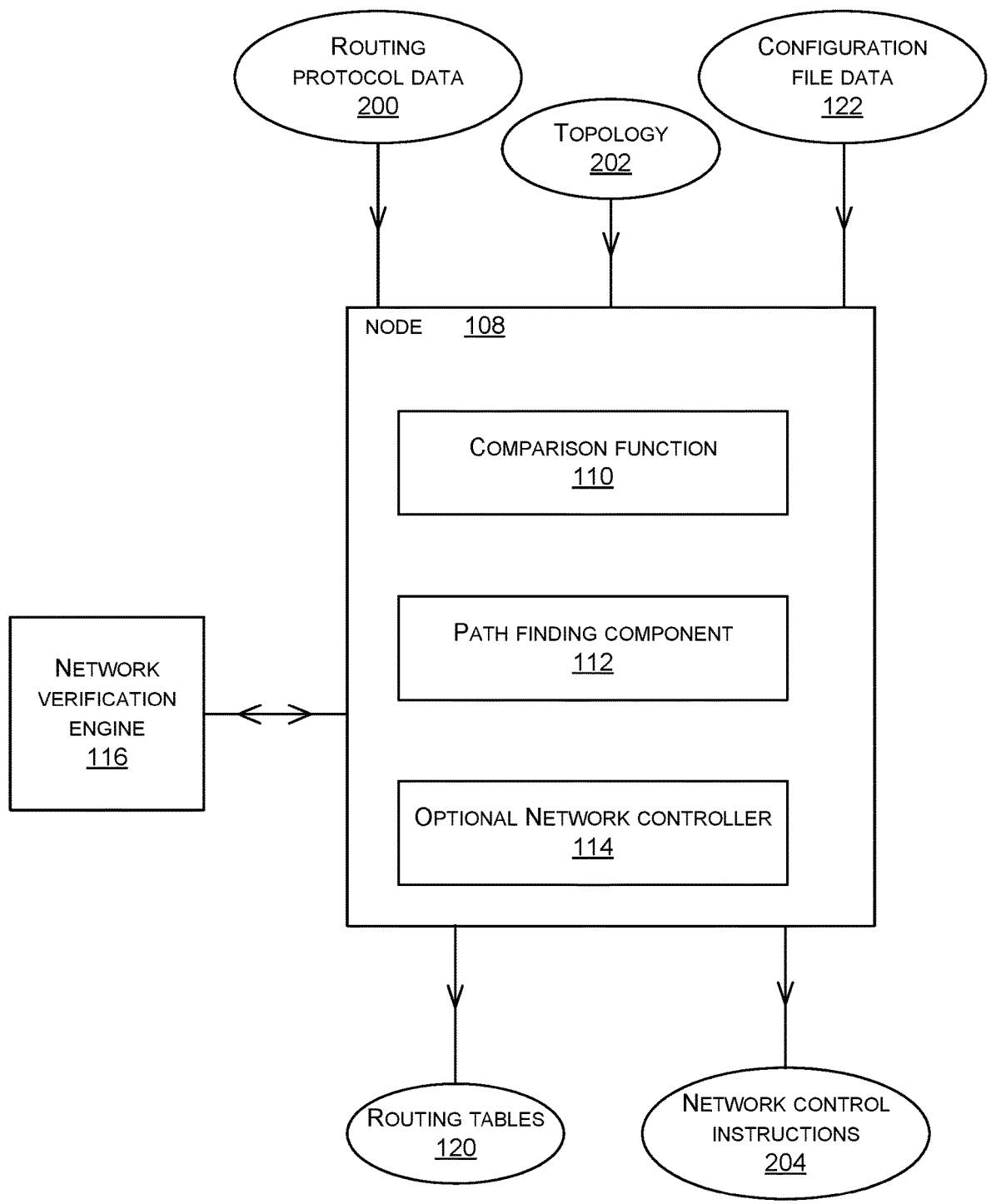
FIG. 2 is a schematic diagram of the node of FIG. 1 in more detail.

FIG. 2 is a schematic diagram of a node 118 of FIG. 1 in more detail. The node 118 takes as input, routing protocol data 200, topology data 202 and configuration file data 122. In some examples the node 118 takes input comprising network performance data although this is not essential. The routing protocol data 200 comprises a best path definition of a routing protocol being executed in the communications network 100 and one or more routing metrics of the routing protocol. The topology data 200 comprises information about the number of nodes 118 and how they are interconnected. The configuration file data 122 comprises at least some data from the configuration files 122; in some examples all the configuration files 122 are available to the node 118.

The node comprises a comparison function 110, a path finding component 112 and, optionally, a network controller 114 as described with reference to FIG. 1 above. The node is optionally connected to a network verification engine 116 as described with reference to FIG. 1 above.

The node 118 computes one or more routing tables, or parts of routing tables 120 for use by the nodes 118 of the communications network 100. The node optionally outputs network control instructions 204 to the nodes of the communications network and/or updates to the configuration files 122.

Alternatively, or in addition, the functionality of the node 118 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2A:
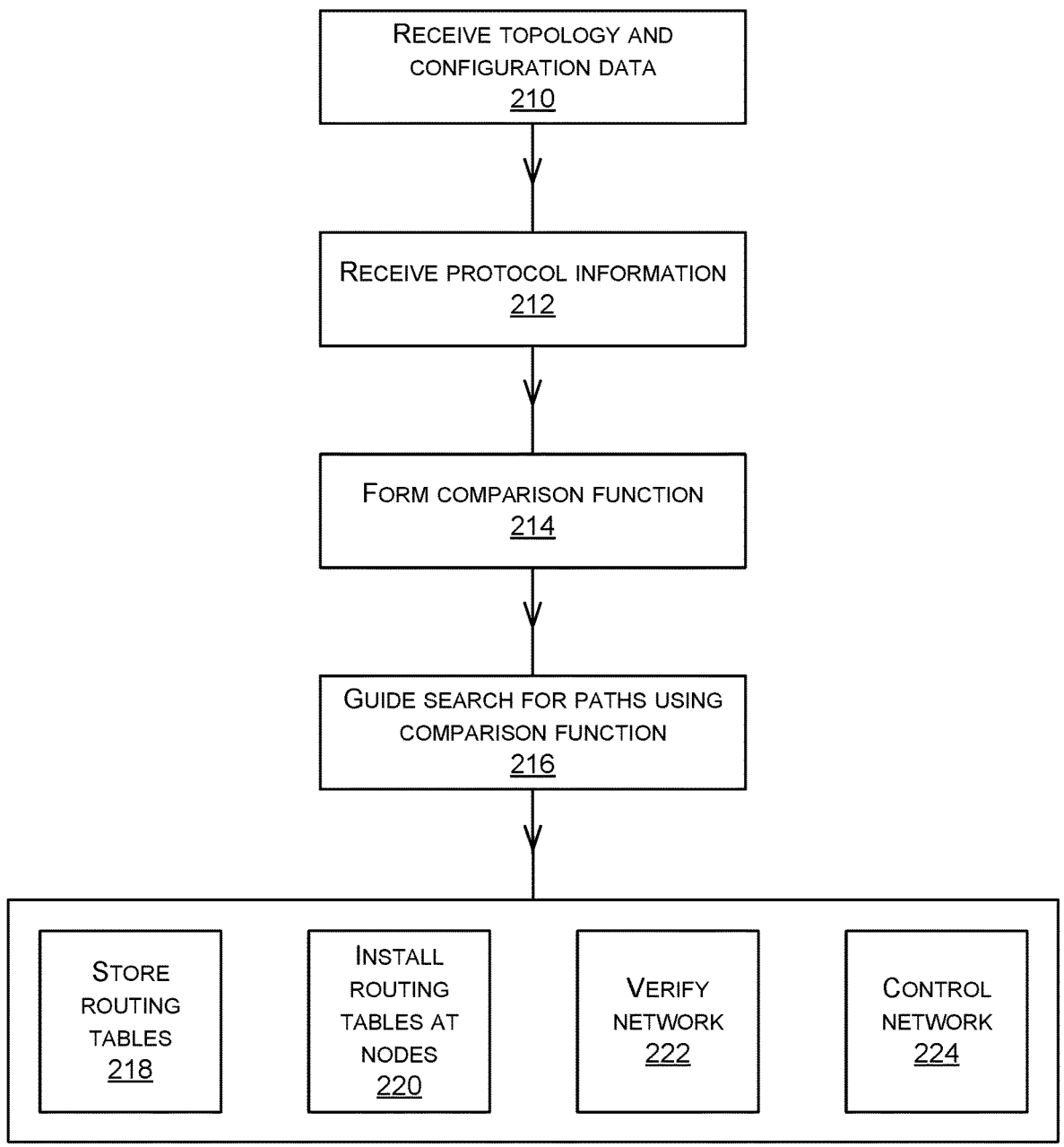
FIG. 2A is a flow diagram of a method of operation at a node such as the node of FIGS. 1 and 2.

FIG. 2A is a flow diagram of a method of operation at a node such as the node of FIGS. 1 and 2. The node receives 210 and stores information about the topology of the network and configuration data comprising attributes of the network. For example, the node is able to access some or all of the data in the configuration files 122 and knows the topology of the communications network 100 either by discovering the topology by sending probe messages and/or observing behavior of the network or by accessing the topology data from another source. The node receives 212 information about a protocol used to route data between the nodes of the network.

The node forms 214 a comparison function derived from a best path definition of the protocol. In some cases the node selects the comparison function from a library of preconfigured comparison functions by selecting one which uses routing metrics based on attributes available in the configuration files. In some cases the node is pre-configured with a comparison function specified by a network administrator.

The node computes a guided search for paths through the communications network, where the search is guided using the comparison function.

For example, the node computes, at a processor, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes.

The routing table(s) computed from the search are stored 218 in some examples and in some cases the node triggers installation 220 of the routing tables at the nodes 118 of the communications network. This gives a technical effect of better routing of data in the communications network which is carried on outside the node 118. The routing tables are used by a verification engine to verify 222 the network in some cases. The routing tables are used to control the network 224 in some cases as described above and this makes the communications network run more efficiently and effectively than for previous approaches using other ways of computing the routing tables. Also, the problem of how to better route data or manage the communications network is overcome by the technology described herein as opposed to merely being circumvented. This is because it is possible to compute the optimal paths through the communications network using the processes described herein in practical time scales, as opposed to not being able to compute optimal paths due to the scale of the problem, or circumventing the problem by making approximations.

Figure 3:
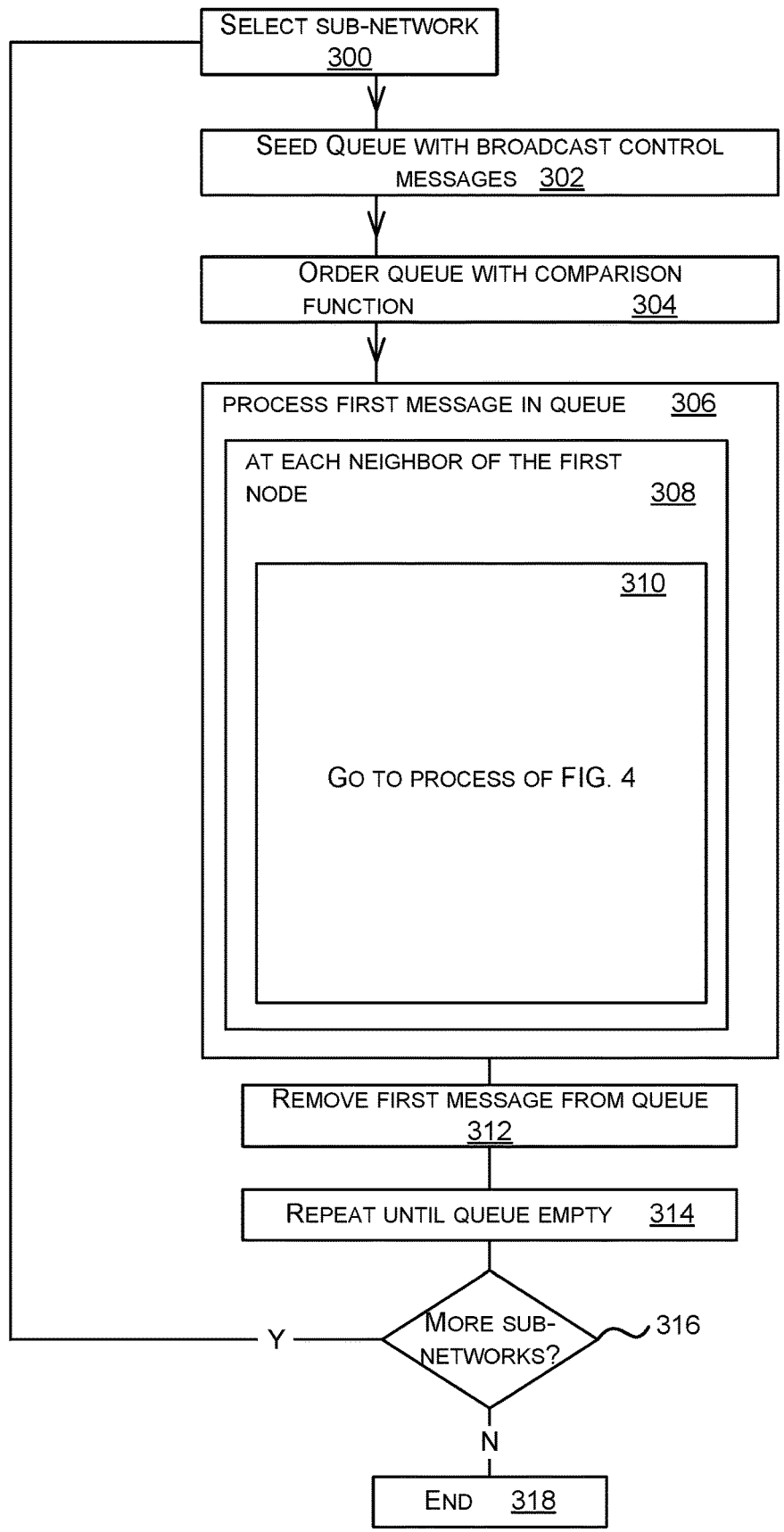
FIG. 3 is a flow diagram of an example method of operation at a node such as the node of FIGS. 1 and 2.

FIG. 3 is a flow diagram of a method of operation at a path finding component 112 of a node 118. This method is carried out at each of a plurality of the nodes 118 of the communications network in some examples where distributed processing is used. However the process of FIG. 3 is carried out at a single node in some cases. The process of FIG. 3 comprises selecting 300 a sub-network (such as an IP prefix as explained earlier in this document). Each run of the process of FIG. 3 computes a plurality of entries of a routing table for each node of the selected sub-network. The process of FIG. 3 repeats for each sub-network of the network for which it is required to compute routing tables.

In some examples the sub-network is selected 300 at random from the available sub-networks which are still to be considered. In other cases, where the sub-networks are not independent of one another, such as where route aggregation is used, the selection process moves through more specific sub-networks before less specific sub-networks. A more specific sub-network is part of a larger combined network (called a supernetwork).

The path finding component 112 of the node 118 doing the computation, accesses an empty queue in memory and seeds 302 the queue with networks that are reachable from the node. A non-exhaustive list of examples of reachable networks the queue may be seeded with is one or more of: locally exported networks, exported local interface addresses, triggered aggregated networks, redistributed routes computed by other routing protocols. In some examples, a seed is a locally generated network export message (as opposed to a received message from a neighbor). A locally generated network export message is a message a node sends to itself to bootstrap the queue. The path finding component then orders 304 the queue using the comparison function. For example, pairs of network export messages in the queue are compared with the comparison function and the results are used to order the network export messages in the queue so that the most preferred network export message is at the head of the queue and the least preferred network export message is at the tail of the queue.

The path finding component 112 processes 306 the first network export message in the queue 306 which is the network export message at the head of the queue. To do this, it computes 308 the process 310 of FIG. 4 for each neighbor of a node corresponding to the network export message at the head of the queue.

The path finding component 112 removes the first network export message from the head of the queue and repeats the process of operations 306, 308, 310 until the queue is empty 314. The path finding component 112 checks 316 if there are more sub-networks to be processed and if so it repeats the process of FIG. 3. Otherwise the process ends 318. By using a queue and ordering the entries in the queue using the comparison function the path finding component explores paths from individual nodes associated with network export messages of the queue in an exploration order which follows the queue order. This gives the benefit of enabling the search to be guided by the comparison function so that the routing tables are computed in practical time scales without sacrificing accuracy. This in turn leads to more efficient control of the communications network.

Figure 4:
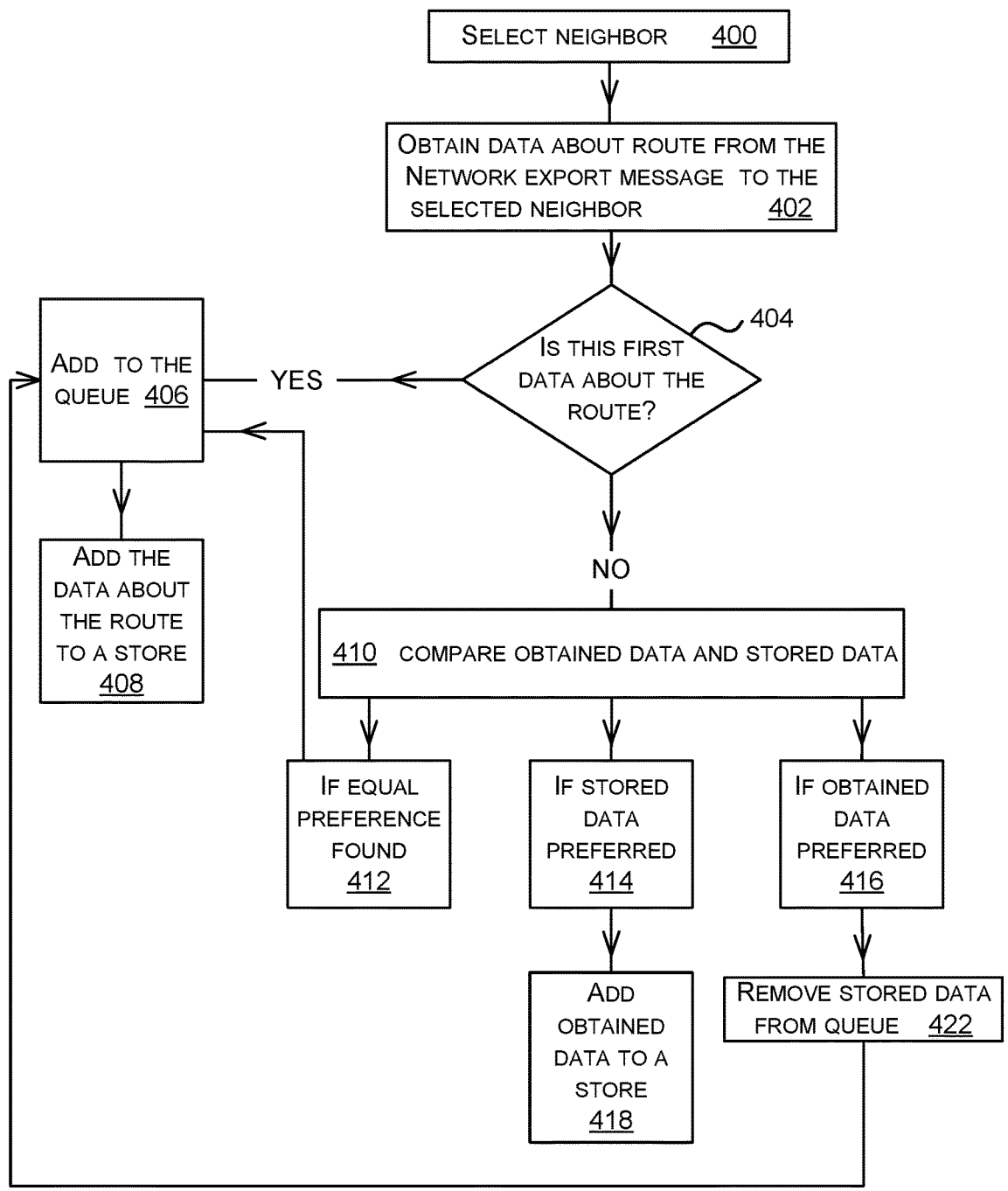
FIG. 4 is a flow diagram of part of the method of FIG. 3.

FIG. 4 is a flow diagram of part of the process of FIG. 3 in more detail. The path finding component 112 has taken a network export message from the head of the queue (referred to here as the first network export message) and is evaluating each neighbor of a first node associated with the network export message. The process of FIG. 4 is about the evaluation of a single neighbor. The neighbor is selected 400 at random or by using the comparison function.

The path finding component 112 obtains 402 data about the route from the network of the network export message that was removed from the queue to the selected neighbor 402 from the topology data and the configuration data which was input to the node (see FIG. 2 above). For example, the data about the route is a bandwidth of the route, or a dropped packet frequency of the route, or one or more other attributes. If 404 this is the first data about the route that the path finding component has obtained, then a network export message about the neighbor is added 406 to the queue and the data about the route (and the identity of the neighbor) is added 408 to a store referred to herein as best [n] [network] which is a store that holds the current best network export message for node n and for the network being explored. The network has been selected and the process computes optimal paths from each node to this network (which is attached to one or multiple nodes). Best [ ][ ] holds information of how to best reach the selected network for each node and the process aims to compute this data. Best [n'][ ] is computed by taking an item from the queue and going "backwards" from n' to its neighbors and checking if any of its neighbors can reach the network in a more optimal way through n'.

If the path finding component 112 already has data about the path to the neighbor it proceeds to operation 410. Operation 410 is a comparison operation which compares the obtained data obtained at operation 402 with the stored data stored in best [n][network].

The comparison operation 410 assesses whether the route from the network of the network export message to the selected neighbor is preferred over routes from the network of the network export message to other neighbors. In some examples the comparison operation 410 compares the magnitude of an attribute.

If an equal preference is found 412 then a network export message about the neighbor is added 406 to the queue so that it will be explored again later in the process. Data about the route to the neighbor is added 408 to the store and the process ends. The path finding component 112 then moves back to the process of FIG. 3 which comprises moving 306 to the next sub-network.

If the obtained data is preferred 416 (i.e. the route through the first node is preferred over the route through another neighbor which has been explored so far), then stored data is removed 422 from the queue. The search space is reduced and efficiencies are gained as a result of the transitive effect of not exploring the non-optimal neighbors. This gives an exponential saving as compared with exploring all paths.

If the stored data is preferred 414 (i.e. the route through the first node is not as good as the best route found so far) then the stored data (i.e. the best route found so far) is added 418 to a store such as the routing table. The process of FIG. 4 then ends and returns to the process of FIG. 3.

An example in which the routing protocol is BGP is now described in detail:

Let a and a' be router network export messages. Network export messages are a unit of information propagated between routers. Each network export message carries the information of the reachability of a sub-network (or a set thereof). Sub-networks are represented by an internet protocol (IP) prefix.

Let $\prec$ be a comparison function between two network export messages. For example, with BGP, a $\prec$ a' holds if, for example, the local preference of a is greater than that of a'. If a $\prec$ a' holds, a is preferred to a'.

For a network running BGP, the function $\prec$ corresponds to the best path definition.

An example of a method to compute routing tables of nodes in a network running BGP consists of a loop invoking a path finding algorithm as described below for each sub-network (or set thereof).

The pseudo code is as follows where the symbol // at the start of a line indicates that the following text in that line is comments rather than pseudo code:

```
// seeds : network ->set(networkexportmessage)
seeds := make_seeds( )
for each (network, networkexportmessages) in seeds do
    findbest_path(network, networkexportmessages, seeds)
done
```

The procedure starts by computing a set of seed network-exportmessages, grouped per sub-network. For BGP, for example, seed network export messages comprise sub-networks sent by each router (e.g., through the network or redistribute commands, through aggregation of locally installed routes, etc).

The order of iteration through networks is relevant where there is a dependency relation between distinct networks (i.e., where network export messages of networks are not independent of each other). An example is a supernetwork using BGP aggregation, where the aggregated prefix (e.g., 192.168.0.0/16) depends on other contributing networks (e.g., 192.168.1.0/24 and 192.168.2.1/32). In this case the process is configured to iterate through more specific networks before the less specific (e.g., by executing the findbest_path algorithm for network 192.168.2.1/32 before executing it for 192.168.0.0/16).

The process computes the routing tables for all nodes for a specific network. The findbest_path process is now described.

```
findbest_path(network, network export messages, seeds):
queue := networkexportmessages
while (queue is not empty) do
    adv := take most preferred network export message from queue
    if (should not broadcast adv)
        continue
    for each enabled neighbor n of device(adv) do:
        adv' := transform adv for neighbor n or skip
// adv' is the first network export message seen for this device
        if best[n][network] is empty do:
            add adv' to best[n][network]
            add best[n][network] to queue
// previously received network export messages are preferred. The
list best[n][network] is sorted using function ≺ and head(.) takes
the minimal element of the list.
        else if head(best[n][network]) < adv':
            add adv' to RIB (routing information base)
// adv' is preferred
        else if adv' < head(best[n][network]):
            add best[n][network] to RIB
            remove best[n][network] from queue
            clear best[n][network]
            add adv' to best[n][network]
            add best[n][network] to queue
// previously received network export messages and adv' are equally
preferred
        else
            add adv' to best[n][network]
            add best[n][network] to queue
    done
done
add best to RIB
add new seeds to seeds or update existing
```

The procedure starts by building a queue from the seed network export messages. Then, network export messages are removed from the queue and processed one by one. The order of removal is established by function ≺.

The procedure then checks if adv should not be further sent. One example is with BGP summary-only aggregates, which block contributing networks from being sent.

The process sends adv to each enabled neighbor. Network export message adv is first transformed by policies in the outgoing device (e.g., route maps), and then it is transformed by policies in the incoming device (the neighbor). After this process, adv' is obtained or the loop iteration is skipped (e.g., in case it was blocked by either the outgoing or incoming device).

Afterward the process compares adv' with the most preferred network export message previously received at the incoming device for the given network(s). In some cases the comparison function< is used and not ≺ to support cases like equal-cost multi-path protocol (ECMP), where it is desirable to keep multiple network export messages for the same network. In some examples, the function < is defined as follows: if BGP multipath is disabled, it is equal to ≺ and otherwise it is as defined in the BGP standard.

Finally, the procedure concludes by adding the most preferred network export messages to the routing table of each device and by adding new seeds for the outer loop to go through (if applicable). An example of a case that triggers new seeds is the creation of a network export message that triggers an aggregation that had not been enabled before.

Note that given the choice of iteration through networks in the outer loop, it is guaranteed that all new or updated seeds have not yet been visited.

Figure 5:
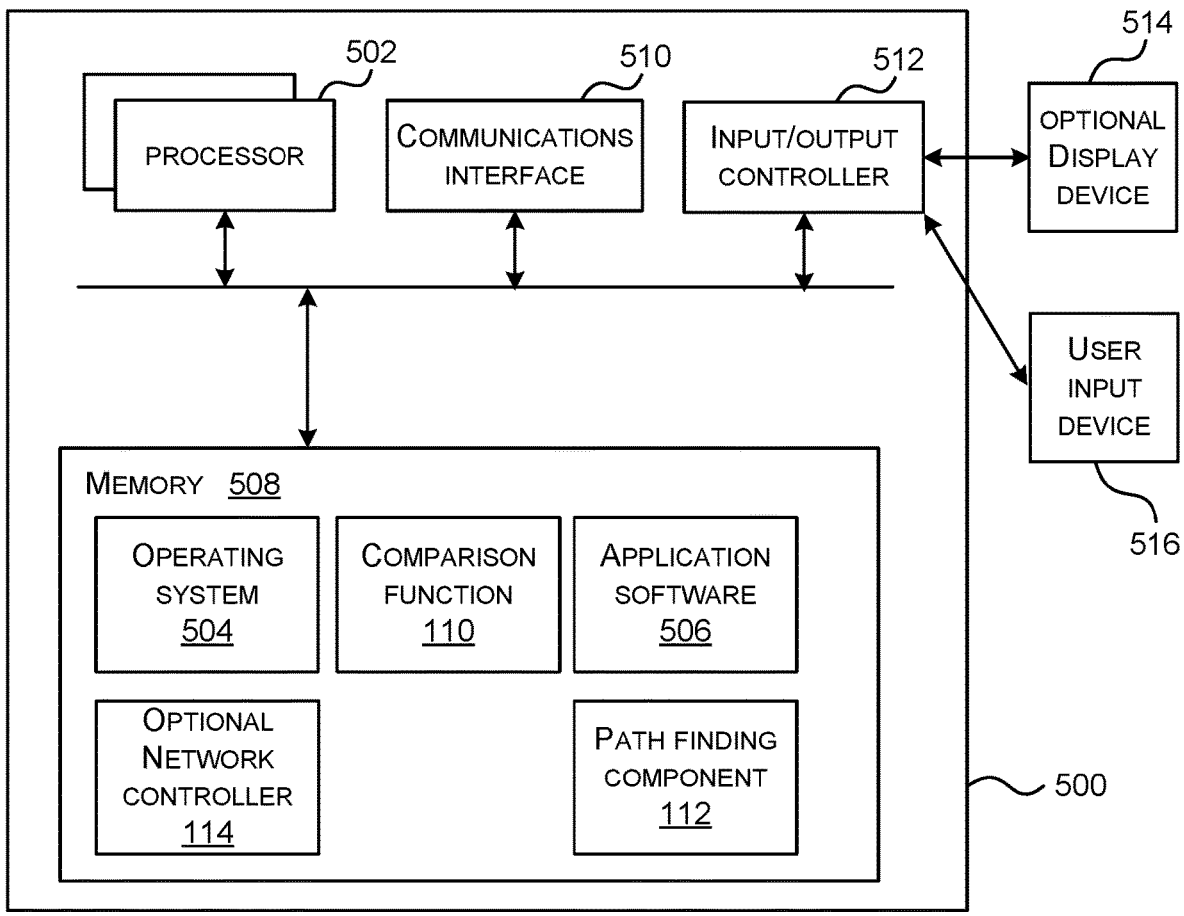
FIG. 5 illustrates an exemplary computing-based device in which embodiments of a node are implemented.

FIG. 5 illustrates various components of an exemplary computing-based device 500 which are implemented as any form of a computing and/or electronic device, and in which embodiments of a node 118 of a communications network are implemented in some examples.

Computing-based device 500 comprises one or more processors 502 which are microprocessors, controllers or any other suitable type of processors for processing computer executable instructions to control the operation of the device in order to compute routing tables and/or control a communications network. In some examples, for example where a system on a chip architecture is used, the processors 502 include one or more fixed function blocks (also referred to as accelerators) which implement a part of the method of any of FIGS. 3 and 4 in hardware (rather than software or firmware). The computing-based device comprises a comparison function stored in memory 508 and a path finding component 112 as described above. The computing-based device comprises a network controller 114 in some examples although this is not essential. Platform software comprising an operating system 504 or any other suitable platform software is provided at the computing-based device to enable application software 506 to be executed on the device.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g. using communication interface 510).

The computing-based device 500 also comprises an input/output controller 512 arranged to output display information to a display device 514 which may be separate from or integral to the computing-based device 500. The display information may provide a graphical user interface. The input/output controller 512 is also arranged to receive and process input from one or more devices, such as a user input device 516 (e.g. a mouse, keyboard, camera, microphone or other sensor). In some examples the user input device 516 detects voice input, user gestures or other user actions and provides a natural user interface (NUI). This user input may be used to specify a comparison function, view routing tables, specify topology data and for other purposes. In an embodiment the display device 514 also acts as the user input device 516 if it is a touch sensitive display device. The input/output controller 512 outputs data to devices other than the display device in some examples, e.g. a locally connected printing device.

Any of the input/output controller 512, display device 514 and the user input device 516 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A node of a communications network comprising a plurality of interconnected nodes, the node comprising:
a memory storing information about the topology of the network, configuration data comprising attributes of the network, and information about a routing protocol of the network;
the memory storing a comparison function derived from a best path definition of the routing protocol;
a path finding component which computes at a processor, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes.

The node described above comprising a network controller which triggers installation of the routing table at the individual node of the communications network and/or triggers update of a configuration file at least one of the nodes.

The node described above comprising a network controller which uses the routing table to control the communications network.

The node described above comprising a network controller which sends the routing table to a network verification engine for use in verifying the communications network complies with criteria. A non-exhaustive list of examples of criteria is: desired traffic policies, law requisites, compliance requisites, performance criteria, network functionality criteria, combinations of one or more criteria.

The node described above wherein the comparison function takes as input information about two nodes of the network and computes an order of preference of the two nodes.

The node described above wherein the comparison function compares two network export messages, where a network export message is a message sent by a node to its neighbors, advertising a sub-network which is reachable from the node which sent the message.

The node described above wherein the path finding component comprises a queue of network export messages about sub-networks of the communications network being considered in paths searched by the path finding component, and wherein the path finding component orders the network export messages in the queue using the comparison function and explores paths from individual sub-networks of the network export messages of the queue in an exploration order which follows the queue order.

The node described above wherein the path finding component seeds the queue with network export messages computed locally by the node.

The node described above wherein the path finding component explores a sub-network of a network export message of the queue by evaluating paths to neighbors of the sub-network being explored and comparing the evaluated paths with a current best path.

The node described above wherein the path finding component adds a network export message about one of the neighbors to the routing table if the evaluated path to that neighbor is preferred over a current best path.

The node described above wherein the path finding component is configured to add a network export message to the queue if the currently evaluated path is not preferred over a previously evaluated path, where the added network export message is about the previously evaluated path.

A communications network comprising a node as described above.

A computer-implemented method at a node of a communications network comprising a plurality of interconnected nodes, the method comprising:

storing information about the topology of the network, configuration data comprising attributes of the network, and information about a routing protocol of the network;

storing a comparison function derived from a best path definition of the routing protocol;

computing at a processor, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes.

The method described above comprising triggering installation of the routing table at one of the nodes, or triggering update of at least one configuration file at one of the nodes.

The method described above comprising ordering the network export messages in a queue using the comparison function and exploring paths from individual nodes of network export messages of the queue in an exploration order which follows the queue order.

The method described above comprising adding a network export message to the queue if a currently evaluated path is not preferred over a previously evaluated path, where the added network export message is about the previously evaluated path.

The method described above comprising exploring a network of a network export message in the queue by evaluating paths to neighbors of the network being explored and comparing the evaluated paths with a current best path.

The method described above comprising triggering update of at least one configuration file at the individual node, using the optimal paths.

A computer-implemented method at a node of a communications network comprising a plurality of interconnected nodes, the method comprising:

storing information about the topology of the network, configuration data comprising attributes of the network, and information about a routing protocol of the network;

storing a comparison function derived from a best path definition of the routing protocol;

computing at a processor, for an individual one of the nodes, a routing table specifying which neighbors of the individual node incoming data received at the individual node is to be routed to, where computing the routing table comprises storing a queue of nodes of the communications network; ordering the nodes in the queue using the comparison function; and exploring paths from individual nodes of the queue in an exploration order which follows the queue order to find paths which are optimal with respect to at least one of the attributes.

A node of a communications network comprising:
means for storing information about the topology of the network, configuration data comprising attributes of the network, and information about a routing protocol of the network;

means for storing a comparison function derived from a best path definition of the routing protocol;

means for computing, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes.

For example, the means for storing is the memory 508. For example the means for computing is the processor(s) 502 when encoded to perform the operations of at least part of FIGS. 3 and 4.

A node of a communications network comprising a plurality of interconnected nodes, the node comprising:
a memory storing information about the topology of the network, configuration data comprising attributes of the network, and information about a routing protocol of the network;

the memory storing a comparison function derived from a best path definition of the routing protocol;

a path finding component which computes at a processor, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes; and a network controller configured to do one or more of: trigger installation of the routing table at a node of the communications network, trigger verification of the communications network using the routing table, control the communications network using the routing table, trigger update of at least one configuration file at the node.

A computer-implemented method at a node of a communications network comprising a plurality of interconnected nodes, the method comprising:

storing information about the topology of the network, configuration data comprising attributes of the network, and information about a routing protocol of the network;

storing a comparison function derived from a best path definition of the routing protocol;

computing at a processor, for an individual one of the nodes, a routing table specifying which neighbors of the individual node incoming data received at the individual node is to be routed to, where computing the routing table comprises searching for optimal paths between the nodes, using the information about the topology of the network and the configuration data, and using the comparison function to guide the search; and wherein optimal paths between the nodes are optimal with respect to one or more of the attributes; and triggering one or more of: installation of the routing table at one of the nodes, verification of the network using the routing table, control of the network using the routing table, trigger update of at least one configuration file at the node.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'sub-network' is used herein to refer to part but not all of a super network.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A node of a communications network comprising a plurality of interconnected nodes, the node comprising:
   a memory storing information about a topology of a network, configuration data comprising attributes of the network, and information about a routing protocol of the network;
   the memory storing a comparison function derived from a best path definition of the routing protocol; and
   a path finding component which computes at a processor, a routing table specifying which neighbors of the node incoming data received at the node is to be routed to, where computing the routing table comprises searching for optimal paths between the node and a destination node through one or more other nodes of the interconnected nodes, using the information about the topology of the network and the configuration data, using the comparison function to compare two or more network export messages, where each of the two or more network export messages is a message sent by the node through each neighboring node of the interconnected nodes to the destination node to advertise each sub-network that is reachable from the node, and using the comparison function to guide the search by processing the two or more network export messages in an order based on the comparing; and
   based on comparison, determine the optimal paths between the node and the destination node, wherein optimal paths between the node and the destination node is optimal with respect to one or more of the attributes;
   wherein the path finding component comprises a queue of network export messages about sub-networks of the communications network being considered in paths searched by the path finding component, and wherein the path finding component orders the network export messages in the queue using the comparison function and explores paths from individual sub-networks of network export messages of the queue in an exploration order which follows the exploration order.

2. The node of claim 1, wherein the network export messages in the queue are arranged from preferred to least preferred, and what this ordering is based on.

3. The node of claim 2, wherein the preference is based on the best path definition of the routing protocol.

4. The node of claim 1, wherein the attributes comprise two or more of the following: bandwidth of an outgoing edge from the node, bandwidth of an incoming edge to the node, processing capacity of the node, round trip time from the node to a neighbor, and cost of peering.

5. The node of claim 1, comprising a network controller which sends the routing table to a network verification engine for use in verifying the network complies with criteria.

6. The node of claim 1, wherein the comparison function takes as input information about two nodes of the network and computes an order of preference of the two nodes.

7. The node of claim 6, wherein the path finding component triggers installation of the routing table at one of the node and the destination node.

8. The node of claim 1, wherein the path finding component wherein the pathfinding component further triggers an update of at least one configuration file at one of the node and the destination node.

9. The node of claim 1, wherein the path finding component seeds the queue with each of the network export messages computed locally by the node.

10. The node of claim 1, wherein the path finding component explores the sub-network of the network export message in the queue by evaluating paths to neighbors of the sub-network of the network export message being explored and comparing the evaluated paths with a current best path.

11. The node of claim 10, wherein the path finding component adds a network export message about one of the neighbors to the routing table if the evaluated path to that neighbor is preferred over the current best path.

12. The node of claim 10, wherein the path finding component is configured to add a network export message to the queue if a current evaluated path is not preferred over a previously evaluated path, where the added network export message is about the previously evaluated path.

13. A computer-implemented method at a node of a communications network comprising a plurality of interconnected nodes, the method comprising:
storing information about a topology of a network, configuration data comprising attributes of the network, and information about a routing protocol of the network;
storing a comparison function derived from a best path definition of the routing protocol; and
computing at a processor, a routing table specifying which neighbors of the node incoming data received at the node is to be routed to, where computing the routing table comprises searching for optimal paths between the node and a destination node through one or more other nodes of the interconnected nodes, using the information about the topology of the network and the configuration data, using the comparison function to compare two or more network export messages, where each of the two or more network export messages is a message sent by the node through each neighboring node of the interconnected nodes to the destination node to advertise each sub-network that is reachable from the node, and using the comparison function to guide the search by processing the two or more network export messages in an order based on the comparing; and
based on comparison, determining the optimal paths between the node and the destination node, wherein optimal paths between the node and the destination node is optimal with respect to one or more of the attributes;
wherein the path finding component comprises a queue of network export messages about sub-networks of the communications network being considered in paths searched by the path finding component, and wherein the path finding component orders the network export messages in the queue using the comparison function and explores paths from individual sub-networks of network export messages of the queue in an exploration order which follows the exploration order.

14. The method of claim 13, comprising triggering installation of the routing table at one of the node and the destination node.

15. The method of claim 13, comprising triggering an update of at least one configuration file at one of the node and the destination node.

16. The method of claim 13, comprising adding a new network export message to the queue if a currently evaluated path is not preferred over a previously evaluated path, where the added new network export message is about the previously evaluated path.

17. The method of claim 13, comprising exploring a particular network of a particular network export message in the queue by evaluating paths to neighbors of the particular network being explored and comparing the evaluated paths with a current best path.

18. The method of claim 13, comprising triggering update of at least one configuration file at the node, using the optimal paths.

19. One or more computer-readable storage devices comprising computer-executable instructions that when executed by one or more processors, cause the one or more processors to perform operations comprising:
storing information about a topology of a network, configuration data comprising attributes of the network, and information about a routing protocol of the network;
storing a comparison function derived from a best path definition of the routing protocol; and
computing, at a processor, a routing table specifying which neighbors of a node incoming data received at the node is to be routed to, where computing the routing table comprises searching for optimal paths between the node and a destination node through one or more interconnected nodes, using the about the topology of the network and the configuration data, using the comparison function to compare two or more network export messages, where each of the two or more network export messages is a message sent by the node through each neighboring node of the interconnected nodes to the destination node to advertise each sub-network that is reachable from the node, and using the comparison function to guide the search by processing the two or more network export messages in an order based on the comparing; and
based on comparison, determine the optimal paths between the node and the destination node, wherein optimal paths between the node and the destination node is optimal with respect to one or more of the attributes;
wherein the path finding component comprises a queue of network export messages about sub-networks of the communications network being considered in paths searched by the path finding component, and wherein the path finding component orders the network export messages in the queue using the comparison function and explores paths from individual sub-networks of network export messages of the queue in an exploration order which follows the exploration order.

20. The one or more computer-readable storage devices of claim 19, wherein the computer-executable instructions, further cause the one or more processors to trigger installation of the routing table at one of the node and the destination node, or trigger an update of at least one configuration file at one of the node and the destination node.

* * * * *